Dec. 16, 1941.  C. H. THAYER  2,266,095
STARTING UP AND TEMPERATURE CONTROL OF CONTACT OPERATIONS
Filed Jan. 4, 1938  2 Sheets-Sheet 1

INVENTOR
Clarence H. Thayer
BY
Ira L. Nickerson
ATTORNEY

INVENTOR
Clarence H. Thayer
BY
Ira L. Nickerson
ATTORNEY

Patented Dec. 16, 1941

2,266,095

UNITED STATES PATENT OFFICE 2,266,095

STARTING UP AND TEMPERATURE CONTROL OF CONTACT OPERATIONS

Clarence H. Thayer, Wallingford, Pa., assignor, by mesne assignments, to Houdry Process Corporation, Wilmington, Del., a corporation of Delaware Application January 4, 1938, Serial No. 183,305

15 Claims. (Cl. 196—52)

The present invention relates to the chemical treatment or transformation of fluids and to systems for controlling the temperature of such treatments. While it concerns the regulation and temperature control of various treatments of fluids, it has special application where the treatments or reactions are carried out in the presence of a contact material or catalyst. It particularly involves treatment or transformation of various reactant fluids, especially hydrocarbons or other such fluids where deposits of combustible materials or contaminants accumulate on a contact material during an on-stream or transformation period of a cycle of operation. During alternate periods of such cycle, contaminants or combustibles may, where desired, be removed from the contact or catalytic material, as by combustion or regeneration in situ.

This invention also involves getting such systems of treatment in operation rapidly and provides for energy recovery and temperature control, all of which are more fully described hereinafter.

The reactant fluid to be treated may involve various fluids as above indicated, but specific illustrations include carbonaceous or hydrocarbon fluids, including those of petroleum, coal, shale, or other origin, natural or artificial.

The treatment or transformation, where the reactants are such as those last-illustrated, may constitute a production of lower boiling from higher boiling hydrocarbons or cracking, reforming to increase the anti-knock rating of the charge without greatly altering its boiling range, polymerizing or the production of higher boiling from lower boiling hydrocarbons, refining or chemical stabilization of fuels of desired boiling ranges to render the same resistant or immune to gum or color formation, or other reactions or conversion operations.

The contact material will depend upon reactants or charge to be treated and the particular transformation or reaction which is sought, but may consist of solid or incombustible materials which are adsorptive and/or catalytically active, or it may comprise relatively non-adsorptive or inert material of a metalliferous or other nature. Where the reactants comprise hydrocarbons, e. g. higher boiling hydrocarbons which it is desired to transform into lower boiling hydrocarbons such as gasoline, for example, the contact material may comprise an adsorptive catalyst such as a blend of silica with another metal oxide or metalliferous material which, in combination with the silica, will render the whole mass active for the purpose desired. A clay-like or silicious material comprising a blend of silica and alumina, with or without small quantities of other active materials, promoters, etc., is illustrative. Materials of this general type are disclosed, for example in Patent No. 2,078,951, issued to Eugene J. Houdry on May 4, 1937.

The present invention may be considered as an improvement over or further development of previously disclosed processes and apparatus which concern the transformation of carbonaceous materials or carbon containing compounds or other reactant fluids, particularly where a contact material is employed, and which concern regeneration of such contact material, and also recovery of energy, including a step of increasing the kinetic energy of fumes or products of regeneration leaving a catalyst or reaction zone. This invention may also be similarly considered in relation to the copending application of Eugene J. Houdry, Serial No. 157,680, filed August 6, 1937, now U. S. Patent 2,195,414, where the circulation of a heat exchange fluid, such as fused salt or salts, molten alloys, etc., in heat exchange relation with a catalyst or contact mass, e. g. of the type hereinabove set forth, is described and is illustrated, for example, in connection with processes for treating or converting organic fluids such as hydrocarbons.

Where the present invention is applied to an operation in which hydrocarbons, such as crude petroleum oil or a fraction thereof, are charged to a reaction chamber or chambers containing catalyst during the on-stream or reaction period of a cycle of operation and, in alternate periods of regeneration, air or other oxygen-containing medium is passed through the catalyst, such catalyst usually being arranged in a plurality of separate confined reaction zones, and where fumes of regeneration may or may not be subjected to a further step of combustion or energy increase after leaving such reaction chambers, for example as described in the copending application of Eugene J. Houdry, Serial No. 266,010 substituted for application Serial No. 78,542, the present invention contemplates circulating and/or controlling the temperature and flow of a heat exchange fluid (e. g. fused salt, mercury, or the like), so as to use excess heat from one step or period of the cycle of operation to control the temperature of another step or period of such cycle and, desirably, also to adjust or control the temperature of incoming reactants and/or regenerating medium and, preferably, also to control the step of energy increase or carbon monoxide combustion. It will be understood that one step of a cycle of operation may take place in one reaction chamber at the same time during which a different step of a similar cycle is being carried out in another reaction chamber.

Among the objects and accomplishments of the present invention are the following: (1) To control the temperatures of endothermic and exothermic reactions; (2) To utilize heat of an operation (such as indicated hereinabove) at a substantially constant rate although heat may be developed or absorbed in different zones at highly variable rates; (3) To provide a system whereby a fluid contacting or catalytic operation carried out in a plurality of separate zones may be controlled in temperature while incurring only a relatively low power consumption; (4) To provide a heat exchange circuit which can be operated over long periods of time without or substantially without the adjustment of valves (although this invention does not exclude the use of valves); (5) To provide, as a specific, preferred aspect, that all or substantially all temperature adjustments which may be needed in the heat exchange fluid, e. g. fused salts, molten alloys, etc., which is circulated through or in heat exchange relation with contact mass or catalyst, may be effected by giving up heat to, or by heat exchange with, materials or fluids employed in the process; (6) To control the temperatures within a plurality of reaction zones, in which reactions are desirably conducted at different temperatures and/or have different heats of reaction, by circulating heat exchange fluid at a common or substantially common temperature, or from a common source or reservoir zone, through or in heat exchange relation with the several reaction zones of such plurality (or with a portion thereof); (7) To provide for minimizing the time consumed in starting up a commercial plant in which large volumes of contact mass or catalyst are arranged in a plurality of separate, confined reaction zones, or getting such a plant into normal and regular operation after it has cooled down, the great importance of which will be more fully understood from further description presented hereinafter; (8) To provide for the operation and control of systems of the types above contemplated while minimizing needed apparatus and hence minimizing the cost thereof; (9) To provide a plurality of separate heat exchange circuits for controlling the temperature of an operation and to keep each circuit isolated from others, where desired. The above and also other purposes and advantages will be evident from the description taken as a whole.

An understanding of illustrative aspects of this invention can be readily had by referring to the exemplary embodiments of suitable apparatus shown in the accompanying drawings, in which.

In further describing the drawings, in the several figures of which like reference characters denote similar parts, a specific reactant fluid will be used by way of illustration. Also, the operation will be described in connection with a particular contact mass or catalyst, a specific method of regeneration appropriate to the selected fluid treatment will be contemplated, and a specific type of heat exchange fluid will be chosen, all, however, for the purpose only of illustrating my invention without thereby in any way intending to limit or confine it by such illustrative description.

Figure 1:
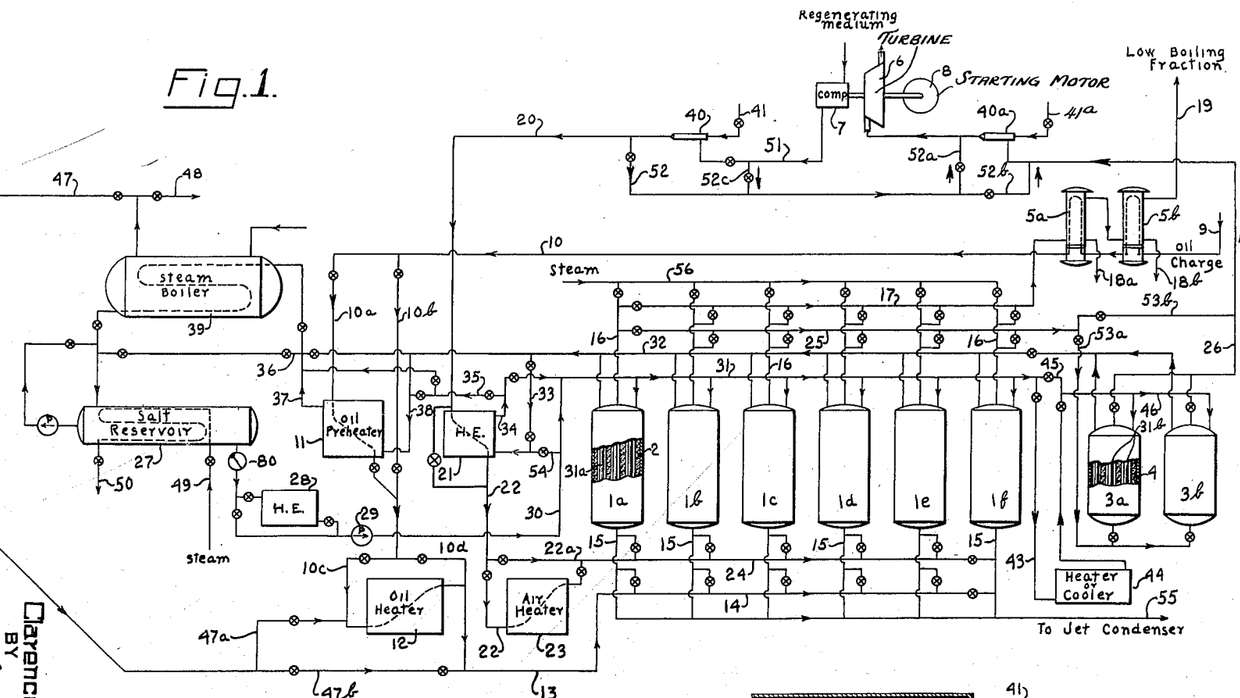
Fig. 1 is a diagrammatic elevational view of apparatus for the treatment or transformation of hydrocarbons, etc., and for control of temperatures and recovery of energy.

In Fig. 1, $1a$, $1b$, $1c$, $1d$, $1e$ and $1f$ are casings or converters which confine reaction chambers, each of which contains a contact mass or catalyst 2, usually in the form of small pieces, fragments or molded particles or pellets (e. g. in the shape of small cylindrical pellets) capable of regeneration in situ. Mass or catalyst 2 may consist of an adsorptive silicious or clayey material; specifically it may comprise a blend of silica with another metalliferous material such as alumina, with or without small amounts of other active materials or regeneration promoters and may be of the type described in the aforementioned Patent No. 2,078,951, of Eugene J. Houdry, $3a$ and $3b$ are combustion cases and each contains a contact material or mass 4 consisting or comprising copper oxide (CuO) or other suitable materials such, for example, as oxides or compounds of iron, cobalt, nickel and lead. $5a$ and $5b$ are partial condensers, or partial condensing heat exchangers, and may be of any desired type, variously described and illustrated in prior descriptions. 6 and 7 indicate the turbine and compressor of a turbo-compressor unit having starting motor 8, which latter is capable also of being run as a generator. In place of or in addition to electric motor generator 8, a steam turbine or other prime movers for starting may be supplied.

Reactant fluid to be treated may be illustrated by a petroleum fraction boiling above or at least to substantial extent above the gasoline boiling range, e. g. a gas oil fraction in which a major proportion of components boil above temperatures of the order of 500°, 600° or 650° F., and which has an end boiling point of, for example, 700° or 750° F. or more. This oil charge may be admitted through line 9 into heat exchange relation in exchangers $5b$ and $5a$ with out-going hydrocarbon products from cases $1a$, $1b$, etc., whereby the oil charge is increased in temperature, for example, is brought up to about 500 to 600° F., and then flows through line 10 and either may be passed through branched line $10a$ into heat exchange relation with hot heat exchange fluid such as fused salt in heat exchanger or oil pre-heater 11 or else may by-pass heat exchanger 11 through line $10b$. The oil stream may then be passed in whole or in part by line $10c$ through oil heater 12, which may, for example, be a direct fired pipe still, or any desired proportion of such stream may be diverted through line $10d$ to pass through line 13 into header 14 which latter communicates with the catalyst or contact mass 2 in the confined reaction zones within each of the converters $1a$, $1b$, etc., through the several valved connections shown and lines 15.

Out-going hydrocarbons or similar products of reaction leave the several reaction zones through lines 16 and pass through the valved connections shown into tubular header 17 and thence through and in heat exchange relation with in-coming oil charge in partial condensing heat exchangers $5a$ and $5b$. A fraction of the highest boiling products of reaction may be withdrawn through line 18a and another fraction of the products of reaction, lower boiling than the last-mentioned fraction but higher boiling than gasoline, may be withdrawn through line 18b, while gasoline or desired low boiling products of reaction may be withdrawn through line 19 and further treated or sent to storage as desired.

In the carrying out of such a process for transforming or cracking higher boiling hydrocarbons to produce lower boiling hydrocarbons, combustible deposits or contaminants accumulate on the contact mass or catalyst 2 so that periodically the flow of vaporous hydrocarbon charge or reactants to each of the cases 1a, 1b, etc. must be interrupted and the contact material regenerated to restore it to active condition, e. g. as by passing an oxygen-containing regenerating medium such as air, or air of modified oxygen content, therethrough, while maintaining the catalyst or contact material in place.

Preliminary to the regeneration of the contact material within each of the converters, it is usually or often desirable to purge each respective reaction zone or bed of contact material which is to be regenerated of hydrocarbon reactants or products of reaction contained therein. This may be accomplished, for example, by purging with a fluid such as steam or flue gases or by evacuation of the type described in Patent No. 2,095,265, issued to J. Howard Pew on October 12, 1937, and/or Patent No. 2,095,264 issued to Arthur E. Pew on the same date, or by both evacuation and steam.

In the operation of a plant as here described, a normal and intended operation is to employ each of the several converters of the battery shown on cycle so that, for example, with the particular number of converters indicated by way of illustration in Fig. 1, two converters may be on stream at any one time for the cracking or transformation of hydrocarbon reactants while the other four converters will be undergoing purging and/or regeneration preliminary to another transformation or on-stream step. For example, a complete cycle of operation may be of the order of 90 minutes in length and the cycles of each of the several converters of the battery shown may be staggered in time so that one converter goes on stream every fifteen minutes. However it will be understood that such length of cycle is exemplary only and that cycles of operation may vary from a relatively short period up to two or three hours or more. Also it will be understood that the proportion of the whole number of converters which is on stream at any one time in a particular operation may vary widely from the above example, which is merely illustrative.

Regenerating medium, e. g. air or other oxygen-containing medium, may be forced by the turbo-compressor unit 6—7 through lines 51 and 20 and then through pre-heater or heat exchanger 21, wherein it may permissibly undergo heat exchange with hot fused salt, as will be hereinafter more fully explained. (The regenerating medium may, of course, be by-passed around heat exchanger 21, if desired, through a line X in the event that no transfer of heat from salt or other heat exchange fluid to air is desired therein.) The regenerating medium, which may then be partially heated, is passed through line 22 and through air heater 23, which may be a direct fired pipe heater, or the regenerating medium may in whole or in part by-pass heater 23 through line 22a, regenerating medium passing at desired temperature into header 24 and from the latter into the reaction zones of selected converters through respective lines 15 and the valved branch lines which join the latter to header 24. In the ordinary case, heat exchanger 21 and heater 23 will not both be employed in a single operation to preheat the regenerating medium, though they may be.

Products of regeneration, normally containing substantial amounts of carbon monoxide (CO) and sometimes appreciable amounts of hydrocarbon vapors or other fluids, pass from the respective converters through respective lines 16 and the valved branch lines shown into header 25, from which latter these fumes or products of regeneration may pass through line 53a into one of the combustion cases 3a or 3b. (The combustion cases are shown in multiple. This is by no means always necessary, but this embodiment minimizes the problem of completely avoiding the possibility of an explosive mixture of fumes from the several cases, some of which may contain some oil vapors. This embodiment also allows the contact material within one case to be regenerated while the other case is in use.) In passing through contact material 4, the fumes or products of regeneration are increased in energy, as by combustion of carbon monoxide to carbon dioxide and/or by controlled combustion of any hydrocarbon or other burnable vapors which are present, and pass from the combustion case through line 26 and thence into and through gas turbine 6. The exit fumes from the gas turbine may be conducted to other heat exchange equipment or discharged to the atmosphere, as desired.

In the specific illustrative operation being described, the on-stream reaction in converters 1a, 1b, etc. is a somewhat endothermic one, usually carried out at a temperature within the range of 750° to 925° F., for example, about 825° to 875° F., and the regeneration is a strongly exothermic reaction beginning in the above range and usually not exceeding 1100° F. as a maximum. The regeneration is normally carried out within the range of 825° to 1050° F. when the on-stream temperature is, for example, approximately 825° to 850° F. The heat required to maintain the contact mass at constant or approximately constant temperature during the endothermic on-stream steps will, in the type of operation illustrated, be of the order of 10% or less, for example 7%, of the heat developed by regeneration. In addition to this large amount of excess heat which is produced by the battery of converters 1a, 1b, etc., excess heat is also developed by the combustion cases 3a and 3b. However, large amounts of heat are required to bring the hydrocarbon reactants and regenerating medium to their respective desired temperatures before admission into the converters. Removing this excess heat from the converters and combustion cases, utilizing the same in the pre-heating of reactants or regenerating medium and/or in effecting other heat exchange such as the generation of steam, and also advantageously utilizing the energy developed by this operation in the generation of motive power, particularly for forcing fluids, e. g. reactants and products of reaction, through the system under desired conditions, are important aspects of the present invention, though they are not all essential features.

The heat exchange fluid, which may comprise various fused salts or salt mixtures, molten metals of suitably low melting point, etc., will be illustrated by a fused mixture of sodium nitrate and potassium nitrite of approximately eutectic proportions, although other fused salts or salt mixtures including potassium nitrate, sodium nitrite, etc., may be used. This fused salt may be passed from reservoir 27 through heater or cooler 28, or may be by-passed around the latter, and then forced by pump 29 through line 30 into header 31. Thence the fused salt may be circulated in heat exchange relation with but out of contact with the catalyst or contact material 2 within the several converters 1a, 1b, etc., in a plurality of spaced passages or circuits suitably disposed, for example, such as tubular members 31a disposed within or extending through the reaction chambers. Out-going heat exchange fluid passes from the several converters through the lines shown into header 32 and from there any desired proportion or all of the same may be passed back to salt reservoir 27. However, any desired proportion of the stream may be diverted through line 33 to pass through heat exchanger 21, thereby to preheat regenerating medium going to the cases, and the salt may then pass through lines 34 and 35, from which latter either a portion or all of the stream may be returned to line 36, or passed in series through oil preheater 11 and then through line 37 into line 36. Where desired, the salt stream coming from header 32 may be passed in parallel through heat exchangers 21 and 11, the parallel streams being re-united in line 36. In this latter operation, a portion of the stream from header 32 is diverted through line 33 and another portion thereof is diverted through line 38, each of such branched streams, after passing respectively through heat exchangers 21 and 11, being sent through the lines shown to conduit 36. All or any desired proportion of the stream may be circulated through steam boiler 39, which latter may have a steam accumulator (not shown) connected thereto if desired. Ordinarily, heat exchange in pre-heaters 21 and 11 and/or the generation of steam in 39 is controlled so that the salt is returned to the reservoir 27 at substantially the temperature desired for recirculation through line 30 to the converters. Where the on-stream temperature contemplated is, for example, about 830° F. and the desired regeneration temperature is, for example, from about 830° to about 1000° F., the fused salt may be circulated in heat exchange with converters which are on-stream and those in regeneration at a common or substantially constant temperature intermediate the on-stream and regeneration temperatures and approaching more closely to the on-stream temperature. For example, fused salt may be circulated at a temperature of about 840° F.

As is clear from the drawings (Fig. 1), fused salt or the like may be passed from header 31 through valved line 43 and heater or cooler 44, or it may partially or entirely by-pass heater or cooler 44 and pass directly through valved line 45 into header 46 and from there into heat exchange with contact material 4 within cases 3a and 3b; for example through reverse flow tubes 31b embedded within the contact material 4. The salt stream leaving these cases may flow back through the line shown into header 32, there to meet with salt streams leaving the several converters 1a, 1b, etc.

While the relative amounts of heat taken from the circulating fused salt or the like in air preheater 21, oil pre-heater 11 and steam boiler 39 can be controlled as desired and varied within wide limits, even to the extent of completely bypassing one or more of these pieces of equipment, it is contemplated that in the ordinary case the extent and manner of the use of each will be guides so as to obtain transfer of heat while maintaining efficiency in the utilization of heat exchange surfaces.

One suitable illustrative operation is to flow enough of fused salt through oil preheater 11 so as to bring the oil passing therethrough up to a temperature within the range of about 700° to 775° F., e. g. up to about 750° F. or below, using oil heater 12 further to heat the stream of oil sufficiently so that it will pass into the converters 1a, 1b, etc., at a temperature of the order of 825° F., for example. This procedure is recommended because I have found that, under the conditions here existing, at temperatures up to about 775° F. transfer of heat from fused salt (around 845° or 850° F.) is better than from flue gases, but at temperatures above about 775° F. it is possible to get better transfer of heat from hot flue gases in a direct fired still than from a stream of fused salt at temperatures above indicated. That is, although the coefficient of heat transfer between the fused salt and oil is high compared with that of heat transfer between flue gases and oil, yet transfer from the salt to oil is not sufficient when the temperature differential between them is small and, in such case, I prefer to effect the desired heating with flue gases where a large temperature gradient is possible, although the coefficient of heat transfer may be relatively poor.

Likewise the stream of regenerating medium may be heated up to a temperature of 700° or 775° F., or even possibly as high as about 850° F. in heat exchanger 21, any desired additional heat being added, for example by air heater 23. Any remaining reduction in the temperature of the salt stream needed or desired may be accomplished by heat exchange with water in steam boiler 39.

In many instances either the oil preheater 11, or the preheater 21 for regenerating medium, will be by-passed entirely by the stream of fused salt, depending upon the quantity of exothermic heat developed in the regeneration of the catalytic material within the cases 1a, 1b, etc., and the amount of heat developed in combustion cases 3a and 3b.

Figure 4:
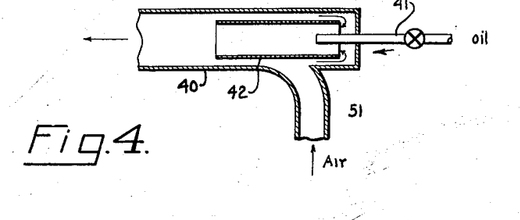
Fig. 4 is an enlarged detail view of an element or member of the apparatus shown in Figs. 1 and 2.

In place of using either heat exchanger 21 or pipe heater 23, it is practical (though often undesirable from the point of view of energy recovery) to provide a part or all of the heating up of the regenerating medium by charging fuel, such as fuel oil, gas, etc., into a burner 40 through valved line 41, air or the like being forced into and through burner 40 by compressor 7. An enlarged detail of burner 40 is shown in Fig. 4 of the drawings. This burner can be controlled so as to draw any desired amount of oxygen containing fluid or air within the inner tube 42 of the burner, which latter may be made adjustable if desired, though this is usually unnecessary.

Any steam desired as process fluid or vaporizing fluid for reactants may be passed from steam boiler 39 through line 47 and a portion thereof may be passed through branch line 47a into the stream of oil before the latter traverses oil heater 12 and/or a portion thereof may be passed through branch 47b so as to be introduced into the oil stream following the oil heater 12. Though not shown in the drawings, where the charging material is such as to render the same desirable, it is within the contemplation of my invention to pass the oil stream through a tar separator or other means for removing difficultly vaporizable or unvaporizable components, and such a separator may be placed in the circuit intermediate the oil heater 12 and manifold header 14. Steam or the like may be introduced into the stream of charge preceding, during or following the tar separation.

Any remaining portion of the steam which may be generated by this process, (or in the event that no steam is withdrawn through line 47, all of the steam generated in the process) may be withdrawn from boiler 39 through line 48 and be employed for driving pumps used in flowing fluids through the process or for any other purposes desired.

The evacuation of converter cases 1a, 1b, 1c, etc., intermediate an on-stream operation and regenerating period, or following a regenerating period and preliminary to a succeeding on-stream operation is not per se a particular part of the present invention, but may be effected for example in the manner described in the aforesaid application of J. Howard Pew, Serial No. 23,533, filed May 27, 1935, which issued as Patent No. 2,095,265, or in the manner described in the aforesaid copending application of Arthur E. Pew, Jr., Serial No. 73,223, filed April 8, 1936, which issued as Patent No. 2,095,264, by applying suitable vacuum to the line 55.

Where steam or other fluid is desired for accomplishing the purging or to aid the purging operation, or for use as process fluid or to aid in the regeneration, the same may be supplied to any desired units of the battery of converters through line 56.

When the plant is shut down for a sufficient amount of time so that the system cools off, the fused salt or like heat exchange fluid may solidify. Because of this fact, salt reservoir 27 is provided with heating means, which may for example take the form of a circulating coil within the reservoir and fed by valved inlet 49, through which steam or the like may be introduced, water or cooled steam being withdrawn from the coil through valved line 50.

Starting up such a plant is an important problem and is also an important aspect of the present invention. According to much of the practice which has heretofore been followed, starting with the plant at approximately atmospheric temperature, it required many hours and often a day or more to get a large commercial plant of this general type uniformly heated up and in normal operation. Extreme care is necessary in heating up such a plant, particularly where the interiors of the converters 1a, 1b, etc., are constructed in the manner illustrated in Fig. 1 of the appended drawings, and/or where heat exchange tubes or other conduits extend into the reaction chambers of each of the several converters to be embedded in a body or bed of catalyst or contact material. In such apparatus reactant fluids may pass straight through the reaction chamber of each converter, from end to end thereof, or they may pass between perforated inlet and outlet conduits extending within the reaction chamber of each converter and embedded in the contact or catalytic material contained therein. A rapid and non-uniform heating up of such apparatus may distort various parts of the same, cause warpage of elements, loosening or breaking of joints, and in general work a very rapid deterioration of the plant as a result of the non-uniform thermal expansion and contraction of different parts of the apparatus. Also in starting up such a plant as here illustrated, which involves the use of a turbo-compressor unit in which the construction or characteristics of the turbine 6 makes desirable or imperative the feeding thereto of gas above a particular temperature or within a narrow temperature range, this portion of the equipment also requires special attention in starting. The care required in getting combustion cases 3a and 3b into operation is generally comparable to that required in getting converters 1a, 1b, etc., in operation.

In starting the apparatus when it is cooled down, for example to atmospheric temperature, the first step may, illustratively, be to flow steam or the like through line 49 in heat exchange with but out of contact with the salt in reservoir 27 so as to heat the salt above its fusing temperature to provide ready circulation of the same by pump 29 through the line 30. While this is being done the turbo-compressor unit may be started in operation, employing starting motor 8 (which latter may serve as a motor for starting up and be used as a generator for absorbing excess power, where desired, after the plant is in operation). The compressor 7 will then force air or the like through the line 51 and possibly also through burner 40. Sufficient fuel may be provided and burned in the burner 40 to heat up the air or other oxygen fluid supplied thereto within the range desired for the turbine 6 or above that temperature at which the turbine and compressor will be in balance, i. e. above that temperature at which the turbine will supply just enough motive power to drive the compressor. These hot products will be returned through valved line 52 and either through branch 52a or 52b back through the turbine 6. In place of the exact steps just recited, it is often preferable to withdraw compressed air, or the like, from line 51 through branch line 52c, thence through branch 52b and through burner 40a, which latter supplies the necessary heat to the stream. The turbine 6 will then begin to develop the needed power and the load will be gradually relieved from motor 8. An ignition means (not shown) such as an electric sparking device, for example, may be employed within each of the burners 40 and 40a to ignite the injected fuel.

Gradually a portion of the product leaving burner 40 will be passed through line 20 and heat exchanger 21 into and through cases 1a, 1b, etc., in direct contact with the catalyst or contact material therewithin and the gases leaving the converters will pass into header 25 and from there may pass through branch 53a and through combustion cases 3a and/or 3b in contact with material 4 therewithin or, if desired, may by-pass the combustion cases through valved branch 53b and then pass through line 26 back to turbine 6. (Prior to passage of the products just mentioned into and through the cases 1a, 1b, etc., the latter, if desired, may be heated somewhat, e. g. up to 250° to 350° F. or above the freezing point of the salt or heat exchange fluid, as by passing superheated steam therethrough.) Where increase of the temperature of these gases is desired before they are admitted to turbine 6, the same may be accomplished in burner 40*a*, although, after the plant is up to normal operating temperature, this latter burner usually need not be used. During the passage of heated air or gases through heat exchanger 21, some or all of the salt stream fed by pump 29 through line 30 may be diverted by valved branch line 54 through heat exchanger 21 and then be passed from the latter through line 34 into manifold header 31 and then into heat exchange with converters 1*a*, 1*b*, etc., and/or in heat exchange with the combustion cases 3*a* and 3*b*. Hence, during the starting up operation heat exchanger 21 is employed to transfer heat from air or the like to the fused salt; whereas, after the plant is in normal operation, this exchanger may be employed to serve the reverse function. Further transfer of heat from air to fused salt may occur within the converters 1*a*, 1*b*, etc., for example, particularly during the fore part of the starting up operation and when the heater 23 is employed to further heat the air or gases in the course of their passage to converters 1*a*, 1*b*, etc. However, a contemplated and advantageous operation is to preheat the fused salt or equivalent to a sufficiently high temperature so that heat is supplied to the contact material and structure of the converters both from the salt, or the like, and from the air, or equivalent, for example in approximately equal amounts, or at least so that the heat transferred to the cases or converters by the salt is a substantial proportion of the entire heat supplied thereto during heating up.

As a preferred variation of the above-described method of starting up, all or substantially all of the compressed air, or other fluid, passing from compressor 7 (after a suitable addition of heat by burner 40) may be sent through line 20 and to and through the converters 1*a*, 1*b*, 1*c*, etc., and/or through either or both of the combustion cases 3*a* and 3*b*, and then back through line 26 to turbine 6, heat being added to the stream before it enters turbine 6 by burner 40*a*.

In the starting up of a plant of this type, after the plant has once been in use and has simply been shut down temporarily for some operating or maintenance reason, there is normally a deposit of carbon on the catalyst or contact material within one or more of the converters 1*a*, 1*b*, etc. Accordingly, in some instances, as where the desired on-stream temperature is above that at which appreciable burning will begin, as soon as the gases circulated by compressor 7 come in contact with the contact material 2 at a sufficiently high temperature, combustion will start within the converters and therefore heat will be generated within the converters which will normally decrease the amount of fuel which need be injected into burner 40 and/or 40*a* and will provide further heating up of the fused salt.

As the plant is brought more and more closely up to desired operating temperature, in the general case, less and less fuel will be fed to burner 40 through line 41 until finally there need be no further addition of heat to the stream flowing through line 20 by burner 40, although, even then, heat may be supplied to the regenerating medium by burner 40, if desired.

Figure 2:
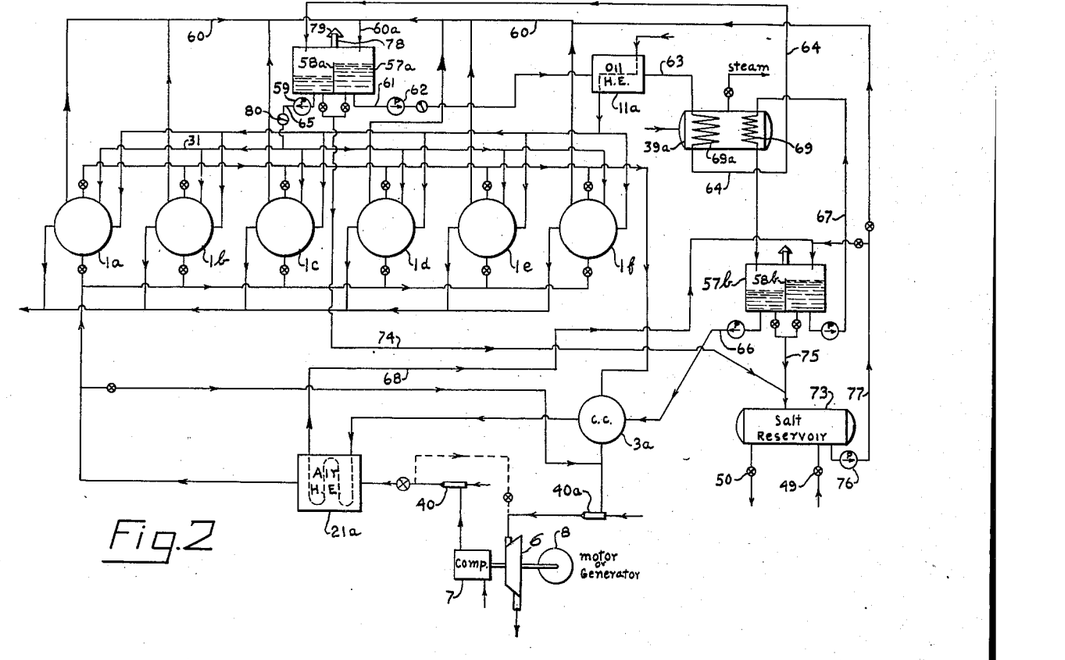
Fig. 2 is a diagrammatic view, partly in plan and partly in elevation, of a modification of the apparatus shown in Fig. 1.

While the invention will be generally understood from the foregoing description taken in connection with Fig. 1 of the drawings, more preferred aspects of the invention, both of process and of apparatus, will be described in connection with Fig. 2 of the drawings. Major differences between the apparatus of Fig. 2 and that of Fig. 1 are that in Fig. 2 a system is provided whereby there is a separate salt system used for the combustion cases (case 3*b* being omitted for the sake of simplicity in the drawings) on the one hand and for the reaction cases or converters 1*a*, 1*b*, etc., on the other. Secondly, Fig. 2 shows a system whereby only a relatively small proportion of the fused salt which is circulated through and in heat exchange relation with the contact material within converters 1*a*, 1*b*, etc., need be circulated through other heat exchange lines so as to control the temperature of the salt stream and hence of the converters as desired. This latter is also true as regards the separate salt circuit provided for the temperature control of the combustion cases. To this end separate reservoirs 57*a* and 57*b* are provided. The reservoirs are each divided into two compartments by central weirs or partitions 58*a* and 58*b*.

Fused salt at desired temperature may be withdrawn from the left hand chamber of reservoir 57*a* by pump 59 and circulated therefrom into header 31, and from the latter through and in heat exchange relation with the several converters 1*a*, 1*b*, etc. The salt streams leaving the converters pass into the line 60 and from there flow through branch 60*a* into the right hand compartment of the reservoir 57*a*. In the type of operation described by way of illustration hereinabove in connection with Fig. 2, the fused salt in the right hand compartment of reservoir 57*a* will be, during normal operation, hotter than that in the left hand reservoir. To control the temperature in the left hand compartment of reservoir 57*a* as desired, a portion only of the fused salt in the right hand reservoir will be allowed to spill over the central weir 58*a* and the remaining portion will be withdrawn through line 61 and forced by pump 62 through oil heat exchanger 11*a* and then through line 63 into and through a coil within a steam boiler 39*a* and thence through line 64 back into the left-hand compartment of reservoir 57*a*. Where desired, pump 62 may be a variable speed pump controlled in response to temperatures in the stream of salt flowing through line 65. However, a good control of the temperature of salt flowing through line 65 can ordinarily be attained by employing a constant speed pump as pump 62, temperatures in line 65 being maintained within a range of about 3 to 6° F. at all times even without any appreciable excess of heat exchange fluid or fused salt in reservoir 57*a*. The flow of salt through line 61 is small as compared with the flow through line 65 and may be of the order of 1/10 or 1/20 or less of the flow through the latter. Hence the substantial economies of this operation will be evident. Important annual savings are provided by eliminating the necessity of having and operating separate valves to control individually the flow of heat exchange fluid to the several converters. Also large savings are effected in power costs and in reduction of cost of apparatus by employing a system of temperature control as above set forth.

The flow of fused salt from reservoir 57*b* and control of the temperature of the fused salt in line 66 is generally similar to that just described in connection with the reservoir 57*a*. The flow of fused salt through line 67 constitutes only a relatively small proportion of the flow through line 66, and is sufficient only to control the temperature of fluid in the left hand compartment of reservoir 57b within the desired range. The heat exchange fluid, after passing in heat exchange relation with the combustion cases or case 3a, then may pass through the air or regenerating medium heat exchanger 21a and then be returned through line 68 to the right hand compartment of reservoir 57b. It will be noted that the relatively small proportion of the salt which is circulated from the right hand compartment of reservoir 57b through a heat exchanger and back to the left hand compartment thereof is passed through a coil in the same boiler 39a, through which fused salt from reservoir 57a is passed. This stream of salt may be passed through an additional heat exchanger before or after its passage through coil 69, if desired. Also, although for the sake of clarity of description the lines are omitted from the drawing, the stream of salt which passes in heat exchange with combustion case 3a may be returned to reservoir 57b without passage through heat exchanger 21a or any desired proportion thereof may be passed through heat exchanger 21a in series or in parallel with case 3a. Likewise, in connection with the control of the temperature of the fused salt within the reservoir 57a, fused salt withdrawn through line 61 may partially or entirely by-pass either oil heat exchanger 11a or the coil 69a within the boiler 39a.

Although a single reservoir only is shown for feeding fused salt to the several converters of the battery 1a, 1b, etc., it is within the scope of this invention to have two or more segregated salt systems or circuits, and hence two or more separate reservoirs, for controlling the temperature of such a battery of converters. Such an increase in the number of salt systems is desirable where the number of converters is very large, in order to minimize power costs and provide economies in apparatus and is also advantageous in the case of certain salt solutions where leaks in the heat exchange circuit may cause a significant loss of heat exchange fluid or interruption of the use of catalytic cases served by such circuit. The arrangement of the cycle of operation of the several converters is also an important consideration in determining whether or not one or more than one heat exchange circuit should be provided for the battery of converters. In general, where the number of converters or the arrangement of the cycle is such that a plurality of separate heat exchange systems could be provided and still the incidental or auxiliary heat exchange apparatus could be maintained constantly or substantially constantly in use, such plurality of segregated heat exchange systems would possess advantages.

Figure 3:
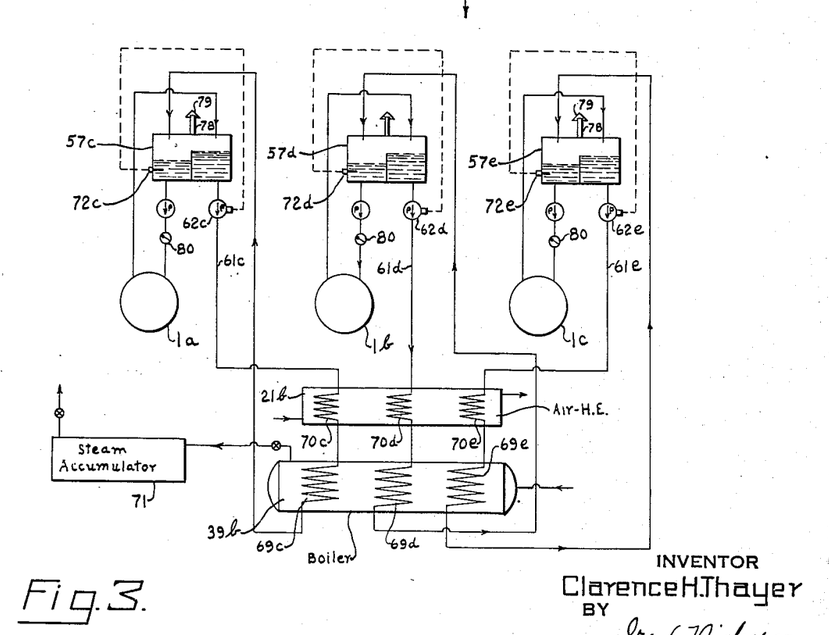
Fig. 3 is a diagrammatic view in plan showing a variation of the heat exchange and energy recovery system shown in Fig. 2.

It is also within the scope of this invention to provide a separate salt system for each converter of the battery, as illustrated in Fig. 3. Note reservoirs 57c, 57d and 57e which respectively serve converters 1a, 1b and 1c. Separate coils 70c, 70d and 70e are provided in the heat exchanger 21b and also separate coils 69c, 69d and 69e are provided in the boiler 39b. Because of the relatively wide fluctuations of temperature of the salt flowing through any of the lines 61c, 61d or 61e, through heat exchanger 21b and boiler 39b, a steam accumulator 71 is provided in connection with the boiler 39b, as shown. In this case pumps 62c, 62d and 62e are variable speed pumps, the speed of each of which is respectively controlled in response to thermostatic or temperature indicating elements 72c, 72d and 72e. In this view the lines for the introduction of oil or other reactants, regenerating medium, steam, etc., are omitted for the sake of clarity, a suitable arrangement in connection with these cases being readily understood and given hereinabove in connection with the apparatus schematically illustrated in Figs. 1 and 2 of the drawings. Reactant fluids may pass through the entire depth of each bed or body of contact material or throughout any desired proportion of the depth thereof, or be distributed within and pass from such a body of contact material in a manner, for example, as described in Patent No. 1,987,904, issued to Eugene J. Houdry on January 15, 1935, or according to any other desired manner.

Salt reservoir 73 (shown in Fig. 2) will be used when salt is to be drained from the system, as during a shut down period. In such case salt may be drained from reservoir 57a through line 74 and from reservoir 57b through line 75. Pump 76 and line 77 are used for returning fused salt to reservoirs 57a and 57b through the lines shown.

Each of the reservoirs is shown with a vent 78 having a cap 79. This is for the purpose of releasing any gases which may occur in the system due, for example, to a leakage between the salt lines within any of the converters or combustion cases and the reaction zones containing the contact mass through which vapors or gases are flowing. In place of the simple construction which is shown for the sake of illustration, member 78 may be transformed into a longer section somewhat similar in construction to a section of a column having overlapping baffles, for example, projecting from the walls thereof in staggered arrangement. In the event such a modified construction is employed, fused salt being returned from heat exchange with the several cases of the battery may be introduced to such a column at some intermediate point therein, thereby providing for release of any gases and drainage of the fused salt back into the reservoir, preferably into the right-hand compartment thereof as the apparatus is illustrated in Figs. 2 and 3 of the drawings.

In this connection also, a check valve 80 is provided in line 65 of Fig. 2, and likewise check valves 80 are provided in the lines through which fused salt or other heat exchange fluid may flow from the reservoirs to the converters in Figs. 1 and 3.

As will be evident from the description taken as a whole, the efficient utilization and conservation of energy in a large commercial system, such as is illustrated in the drawings, is a problem of prime practical importance and a problem the solution of which may in many instances determine whether or not a given contact or catalytic process is commercially feasible.

It will be understood that the apparatus described is applicable for use in other processes besides the one specifically defined, for example in the reforming, polymerizing or other treatment of hydrocarbons, such as fractions derived from petroleum or coal, or other fluids, particularly those requiring accurate temperature control during treatment, and also can be employed in various other temperature ranges than those illustrated, if desired. Since it is normally preferable that the heat exchange fluid employed be such a material that it will be completely or largely in liquid phase under the temperatures employed and can be circulated in direct heat conducting relation with the catalyst or contact material, such material will be selected in accordance with the particular conditions of the reaction contemplated. For example, within certain temperature ranges, materials such as certain low melting metal alloys may be desirable. Also different fused salts may be employed where different temperatures are desired.

The above description of specific adaptations of my invention is offered by way of explanation and is not meant to constitute any limitation on my invention, the same comprehending all embodiments and adaptations which come within the scope of the appended claims.

What I claim is:

1. In the treatment of reactants including hydrocarbons under controlled temperature conditions wherein one type of solid adsorptive contact material is used in a cycle of operation involving a period of higher temperature regeneration reaction and an alternate period of a lower temperature on stream reaction and a different type of solid contact material is used to treat products of regeneration, the process which comprises the steps of supplying the on stream and regeneration reactants alternately to the first mentioned contact material and withdrawing desired products from the on stream reaction and a mixture of carbon monoxide and carbon dioxide as the products of the regeneration reaction, sending the last mentioned products through the second mentioned contact material to convert carbon monoxide to carbon dioxide, circulating a separate body of heat exchange fluid in indirect heat exchange relation with each of said contact materials to maintain the contact materials at different temperatures, withdrawing a portion of each of the bodies of heat exchange fluid and passing one of the portions in heat exchange relation with the on-stream reactants and one in heat exchange relation with the regeneration reactants to condition said reactants before they are supplied to the first mentioned contact material.

2. In the treatment or conversion of reactant fluids including hydrocarbons with a solid adsorptive mass or catalyst and the temperature control of such treatment or conversion, said catalyst being confined within at least one reaction zone, the steps of process which comprise maintaining said reaction zone alternately on stream to effect the desired conversion of reactant fluid and in regeneration to remove combustible deposits or contaminants which accumulate on the mass or catalyst during each preceding on-stream period; flowing a heat exchange fluid, which will remain substantially completely in the liquid phase under the reaction conditions encountered, through and in heat exchange relation with but out of contact with the catalyst or mass within said reaction zone or zones so as to control the temperatures of the different reactions carried out therein; withdrawing heat exchange fluid out of heat exchange relation with said catalyst and flowing it to a reservoir zone being in direct but restricted fluid inter-communication with a second reservoir zone; withdrawing from the first-mentioned reservoir zone a small proportion of the heat exchange fluid introduced therein as a substantially continuous stream, reducing the temperature of the latter by giving up heat therefrom to fluids which it is desired to preheat before introducing them into contact with the aforesaid catalyst; passing the cooled stream of heat exchange fluid into said second reservoir zone, flowing a major proportion of said heat exchange liquid directly from the first-mentioned reservoir zone to said second reservoir zone, the aforesaid cooled stream of heat exchange fluid being of such temperature that the body of liquid in said second reservoir zone is of desired temperature for again circulating in heat exchange relation with the aforesaid catalyst or mass; passing heat exchange liquid from said second reservoir zone and again circulating it in heat exchange relation with said catalyst, and repeating the above steps of process.

3. The process for transforming or chemically changing reactant fluids including hydrocarbons, and controlling the temperatures of such operation, which comprises passing the reactant charge, at a temperature approximating that desired for reaction, into a confined reaction zone in contact with solid, incombustible catalytic material contained within said zone and withdrawing fluid hydrocarbon products of reaction therefrom, combustible deposits and contaminants accumulating on said catalytic material during the transformation of reactant fluid, periodically interrupting the reactant fluid and passing an oxygen-containing gaseous regenerating medium or charge through said confined reaction zone to burn combustible deposits therefrom, the transformation step and the regenerating step having different heats of reaction and the regenerating step being strongly exothermic, passing a liquid heat exchange medium from one compartment of a reservoir zone through and in heat exchange relation with said catalytic material within said reaction zone and then back to a second compartment of said reservoir zone which is in restricted fluid intercommunicating relation with the first-mentioned compartment thereof, said liquid heat exchange medium being passed from said reservoir zone to said reaction zone at a temperature sufficiently below the desired temperature of regeneration so as to absorb sufficient heat to maintain the zone during regeneration within a desired restricted temperature range and so also as to maintain the on-stream or transformation step within a desired range; withdrawing heat exchange medium from said second compartment of said reservoir zone, at a rate small as compared with the amount of heat exchange fluid circulated per unit time through said reaction zone, and passing the same through a heat exchange zone in heat exchange relation with another fluid to adjust the temperature of the heat exchange medium, and returning the stream of heat exchange fluid to the first-mentioned compartment of said reservoir zone, heat exchange fluid being substantially continuously circulated from said first-mentioned compartment through said reaction zone and the above operations being repeated over and over.

4. In the use of a plurality of converters containing contact material wherein each converter is employed in a cycle of operations involving alternate regeneration and on-stream reactions carried out at higher and lower temperatures, respectively, wherein on-stream reactants and regeneration reactants are supplied to different converters for simultaneously carrying out the different reactions and heat exchange fluid is circulated through the contact material in the converters to control the temperature of the reactions, the process of heating up the contact material which comprises admitting a stream of gaseous fluid in heated condition to the converters for passage in direct heat exchange relation with the contact material therein, admitting a stream of heat exchange fluid in heated condition to confined passageways in the contact material for passage in indirect heat exchange relation with the contact material, gradually increasing the temperature of the fluids and passing them through the contact material until it reaches a temperature approximately that of the on-stream reaction.

5. In the contact treatment of reactant fluids in a reaction chamber containing solid porous contact material used in a cycle of operations involving alternate periods of higher and lower temperature reactions wherein heat exchange fluid is circulated during the cycle to control the temperature of the reactions, the process of heating up the contact material to desired temperature for effecting the alternate reactions which comprises admitting a gaseous medium in heated condition to the contact material for raising its temperature by passing in direct heat exchange relation therewith and admitting a heat exchange fluid to confined passageways in the contact material for passage in indirect heat exchange relation with the contact material during the passage of said gaseous medium, gradually increasing the temperature of both said fluids until the contact material reaches approximately the temperature of the lower temperature period of the cycle.

6. In the contact treatment of reactant fluids in a reaction chamber containing solid porous contact material used in a cycle of operations involving alternate periods of higher and lower temperature reactions wherein heat exchange fluid is circulated during the cycle to control the temperature of the reactions, the process of heating up the contact material to desired temperature for effecting the alternate reactions which comprises admitting a gaseous medium, in heated condition to raise the temperature of the contact material by passing in direct heat exchange relation therewith, then admitting a fused mixture of nitrates and nitrites heated to the liquid state to confined passageways in the contact material for passage in indirect heat exchange relation with the contact material, gradually increasing the temperature of both said fluids until the contact material reaches approximately the temperature of the lower temperature period of the cycle.

7. In the contact treatment of reactant fluids in a reaction chamber containing solid porous contact material used in a cycle of operations involving alternate periods of higher and lower temperature reactions wherein heat exchange fluid is circulated during the cycle to control the temperature of the reactions, the process of heating up the contact material to desired temperature for effecting the alternate reactions which comprises admitting a gaseous medium in heated condition to the contact material for raising its temperature by passing in direct heat exchange relation therewith, admitting a fused mixture of nitrates and nitrites heated to the liquid state to confined passageways in the contact material for passage in indirect heat exchange relation therewith, prior to admitting said fluids, passing them in heat exchange relation with each other, gradually increasing the temperature of both said fluids until the contact material reaches approximately the temperature of the lower temperature period of the cycle.

8. In the contact treatment of reactant fluids in a reaction chamber containing solid porous contact material used in a cycle of operations involving alternate exothermic and endothermic reactions carried out at higher and lower temperatures, respectively, wherein heat exchange fluid is circulated at a substantially constant temperature intermediate the temperatures of the reactions during the cycle to control the temperature of the reactions, the process of heating up the contact material to desired temperature for effecting the alternate reactions which comprises admitting an oxygen containing fluid in heated condition to the contact material for raising its temperature by passing in direct heat exchange relation therewith, admitting an eutectic mixture of nitrates and nitrites heated to above 250° F. to confined passageways in the contact material for passage in indirect heat exchange relation therewith, gradually increasing the temperature of both said fluids and passing them through the contact material until the contact material reaches approximately the temperature of the endothermic period of the cycle of operation, then utilizing the heat exchange fluid during the cycle of operations.

9. In the contact treatment of reactant fluids in reaction chamber containing solid porous contact material used in a cycle of operations involving alternate endothermic and exothermic reactions wherein the endothermic reaction is carried out between 750° and 925° F. and the exothermic reaction is carried out between 825 and 1100° F. wherein heat exchange fluid is circulated at a substantially constant temperature intermediate the temperatures of the reactions during the cycle to control the temperature of the reactions, the process of heating up the contact material at desired temperature for effecting the alternate reactions which comprises admitting an oxygen containing fluid in heated condition to the contact material for raising its temperature by passing in direct heat exchange relation therewith, admitting a fused mixture of nitrates and nitrites heated to liquid state to confined passageways in the contact material for passage in indirect heat exchange relation therewith, gradually increasing the temperature of both said fluids and passing them through the contact material until it reaches approximately the temperature of the endothermic period of the cycle of operation, then utilizing the heat exchange fluid during the cycle of operations.

10. In the use of a plurality of converters containing contact material wherein each converter is employed in a cycle of operation involving alternate regeneration and on-stream reactions carried out at higher and lower temperatures, respectively, wherein on-stream reactants and regeneration reactants are supplied to different converters for simultaneously carrying out the different reactions and heat exchange fluid is circulated at a substantially constant temperature intermediate the temperatures of the reactions through the contact material in the converters to control the temperature of the reactions, the process of heating up the contact material which comprises admitting a stream of gaseous fluid in heated condition to the converters for passage in direct heat exchange relation with the contact material therein, admitting a stream of heat exchange fluid in heated condition to confined passageways in the contact material for passage in indirect heat exchange relation with the contact material, gradually increasing the temperature of the fluids and passing them through the contact material until it reaches a temperature approximately that of the on-stream reaction, adjusting the temperature of the heat exchange fluid by passing it in heat exchange relation with at least one of the reactants and utilizing the heat exchange fluid in the cycle of operation.

11. In the use of a plurality of converters containing contact material wherein each converter is employed in a cycle of operation involving alternate regeneration and on-stream reactions carried out at higher and lower temperatures, respectively, wherein on-stream reactants and regeneration reactants are supplied to different converters for simultaneously carrying out the different reactions and heat exchange fluid is circulated at a substantially constant temperature intermediate the temperature of the reactions through the contact material in the converters to control the temperature of the reactions, the process of heating up the contact material and for carrying out the reactions which comprises admitting a stream of gaseous fluid in heated condition to the converters for passage in direct heat exchange relation with the contact material therein, admitting a stream of heat exchange fluid in heated condition to confined passageways in the contact material for passage in indirect heat exchange relation with the contact material, gradually increasing the temperature of the fluids and passing them through the contact material until it reaches a temperature approximately that of the on-stream reaction, adjusting the temperature of the heat exchange fluid by passing it in heat exchange relation with both said reactants in parallel streams and utilizing it in the cycle of operation.

12. In the contact treatment of reactant fluids in a reaction chamber containing solid porous contact material used in a cycle of operations involving alternate periods of higher and lower temperature reactions and wherein heat exchange fluid is circulated during the cycle to control the temperature of the reactions, the process of heating up the contact material for carrying out the reactions which comprises supplying a stream of gaseous fluid to the reaction chamber and prior to its admission compressing and heating said fluid so that it passes through the contact material in direct heat exchange relation to supply heat thereto, withdrawing said fluid under pressure from the contact material and adding heat thereto, then recovering energy from the heated fluid to supply motive power for continuing the compressing of the gaseous stream, after compression of the incoming stream, gradually increasing the temperature of the stream and continuing its circulation through the contact material until reaction temperature is reached.

13. In the use of a plurality of converters containing contact material wherein each converter is employed in a cycle of operation involving alternate regeneration and on-stream reactions carried out at higher and lower temperatures, respectively, wherein on-stream reactants and regeneration reactants are supplied to different converters for simultaneously carrying out the different reactions and heat exchange fluid is circulated through the contact material in the converters to control the temperature of the reactions, the process of heating up the converters for carrying out the reactions which comprises compressing and heating a stream of gaseous fluid, passing at least a portion of the gaseous fluid in heat exchange relation with a heat exchange medium to heat up said medium, circulating the heat exchange fluid through confined passageways in the converters in indirect heat exchange relation with the contact material and the gaseous fluid directly through the contact material, withdrawing said gaseous fluid and adding heat thereto, then recovering energy from the heated fluid to supply motive power for continuing the compressing of the gaseous stream, gradually increasing the temperature of the gaseous fluid after it is compressed and continuing its circulation through the contact material simultaneously with the circulation of the heat exchange fluid until the contact material reaches reaction temperature.

14. In the use of a plurality of converters containing contact material wherein each converter is employed in a cycle of operation involving alternate regeneration and on-stream reactions carried out at higher and lower temperatures, respectively, wherein on-stream reactants and regeneration reactants are supplied to different converters for simultaneously carrying out the different reactions and heat exchange fluid is circulated through the contact material in the converters to control the temperature of the reactions, the process of heating up the converters for carrying out the reactions which comprises compressing and heating a stream of gaseous fluid, passing the gaseous fluid in heat exchange relation with a heat exchange medium to heat up said medium, withdrawing the gaseous stream from the heat exchange medium, then adding more heat to the gaseous fluid and recovering energy therefrom for continuing the compression of the incoming gaseous stream, admitting the heat exchange medium in its heated state to confined passageways in the contact material for passage in indirect heat exchange relation therewith in order to supply heat thereto, gradually raising the temperature of the gaseous fluid after compression and continuing its circulation in heat exchange relation with the heat exchange medium and continuing simultaneously the circulation of the heat exchange fluid through the contact material until the contact material reaches reaction temperature.

15. Apparatus for the treatment or conversion of fluid and control of the temperature thereof which comprises a plurality of converters, each having a reaction chamber containing a solid incombustible catalytic material, means for passing fluids into and through the reaction chambers of said converters and in contact with the said catalytic material located within each, means for withdrawing products of reaction from said chambers, structure providing a plurality of spaced passages dispersed within catalytic material in said reaction chambers, a reservoir for heat exchange fluid having separate chambers, means for passing heat exchange fluid from one of the chambers of said reservoir, through the said spaced passages within said reaction chambers and back into a second chamber of said reservoir; means for withdrawing fluid from said second chamber, adjusting the temperature thereof as desired and returning the same to said one chamber of said reservoir; and means within said reservoir for maintaining a substantially constant volume of liquid heat exchange fluid within said second chamber of said reservoir and permitting excess heat exchange fluid to pass directly to the said one chamber of said reservoir.

CLARENCE H. THAYER.

CERTIFICATE OF CORRECTION.

Patent No. 2,266,095. December 16, 1941.

CLARENCE H. THAYER.

It is hereby certified that error appears in the printed specification of the above numbered patent requiring correction as follows: Page 8, second column, line 24, claim 3, after the article "the" insert --introduction of--; and that the said Letters Patent should be read with this correction therein that the same may conform to the record of the case in the Patent Office.

Signed and sealed this 20th day of January, A. D. 1942.

Henry Van Arsdale,
Acting Commissioner of Patents.

(Seal)